United States Patent [19]

Cutler et al.

[11] Patent Number: 4,589,050

[45] Date of Patent: May 13, 1986

[54] METHOD AND APPARATUS FOR THE PROTECTION OF A THYRISTOR POWER CONVERSION SYSTEM

[75] Inventors: John H. Cutler, Roanoke; Loyal N. Stallard, Daleville, both of Va.

[73] Assignee: General Electric Company, Salem, Va.

[21] Appl. No.: 689,418

[22] Filed: Jan. 7, 1985

Related U.S. Application Data

[63] Continuation-in-part of Ser. No. 467,303, Feb. 17, 1983, abandoned.

[51] Int. Cl.$^4$ .............................................. H02H 3/26
[52] U.S. Cl. ........................................ 361/86; 361/92; 363/54; 363/57
[58] Field of Search ................... 361/18, 86, 87, 92; 363/54–58, 87, 129

[56] References Cited

U.S. PATENT DOCUMENTS

| | | | |
|---|---|---|---|
| 3,383,522 | 8/1965 | Apfelbeck et al. | 361/92 X |
| 4,084,205 | 4/1978 | Bohnert | 361/92 X |
| 4,218,728 | 8/1980 | Chambers et al. | 363/54 |

FOREIGN PATENT DOCUMENTS 971227  7/1975  Canada ................................ 361/92
473255  8/1972  U.S.S.R. ............................. 361/92

*Primary Examiner*—A. D. Pellinen
*Assistant Examiner*—Jonathan Wysocki
*Attorney, Agent, or Firm*—Arnold E. Renner

[57] ABSTRACT

Each of the three phase power source voltages coupled to a three phase (3∅) thyristor power converter are respectively half-wave rectified to provide both positive and negative voltages. Signals representing the largest positive rectified voltage and the smallest positive rectified voltage are developed as are signals representing the largest negative rectified voltage and the smallest negative rectified voltage. Using signals from both the positive and negative rectified voltages, at least one comparison is made to determine a difference which, when in excess of a predetermined limit, effects a logic signal to provide an indication that an asymmetrical fault exists either phase to neutral or phase to phase across the power converter and the power lines connecting the converter to a polyphase alternating current (AC) source. Following a suitable delay, protective action is initiated, which action comprises either phasing back of gating to the converter thyristors and/or tripping of a circuit breaker or contactor which operates to interrupt the supply of AC power to the converter.

49 Claims, 9 Drawing Figures

METHOD AND APPARATUS FOR THE PROTECTION OF A THYRISTOR POWER CONVERSION SYSTEM

CROSS REFERENCE

This application is a continuation-in-part of application Ser. No. 467,303, filed Feb. 17, 1983 now abandoned.

BACKGROUND OF THE INVENTION

This invention relates generally to systems for protecting thyristor type power conversion systems and more particularly to the method and apparatus for detecting and initiating a protective action in response to asymmetrical unidirectional faults occurring on such power systems.

Techniques for the detection of asymmetrical unidirectional faults on power systems, particularly systems supplying thyristor type power conversion apparatus, are generally known. One known prior art method involves the use of negative sequence relays in the supply circuit. These devices, however, suffer from two major drawbacks: (1) they often malfunction in the presence of harmonic voltages normally associated with controlled rectifier conversion apparatus; and (2) they cannot be used on variable frequency systems because they fail to operate when the frequency deviates from the nominal design frequency.

Another known protective scheme involves the use of current transformers in the AC power line conductors feeding power from a polyphase, e.g., a three phase (3∅) AC source to the converter. These too have been found to have severe limitations in that current transformers saturate, whereupon the output signal provided is not representative of the actual current being sensed. Additionally, current transformers, being electromagnet devices, are inherently bulky, expensive, and require a considerable amount of dedicated mounting space.

SUMMARY OF THE INVENTION

It is, therefore, an object of the present invention to provide an improvement in protective systems for alternating current (AC) power conversion apparatus.

It is a further object of the invention to provide an improved system for detecting asymmetrical faults occurring on power systems supplying thyristor power converters.

It is still a further object of the invention to provide an improved system for the detection of asymmetrical unidirectional faults on polyphase power systems supplying polyphase AC power to thyristor converters.

Still another object of the invention is to provide an improved system for the detection of asymmetrical unidirectional faults on three phase (3∅) AC power systems supplying thyristor type power converters which is immune not only to wide swings in source frequency, but is also immune to distortion of the AC waveforms caused by commutation.

Yet another object of the invention is to provide an improved system for detecting asymmetrical unidirectional faults in power systems supplying thyristor power converters which eliminates the requirement of bypassing during initial excitation of the system and during power removal.

The foregoing and other objects are achieved by a method and apparatus for detecting asymmetrical unidirectional faults by invidually rectifying both the positive and negative half-wave voltages of each of the phases of an alternating current source supplied to a polyphase thyristor power converter. A determination is made of the largest and smallest of the positive and negative rectified voltages and, utilizing values from both the rectified positive and negative voltages, a comparison is made to determine a difference. In the event that the difference exceeds a predetermined limit, a logic output signal is produced to provide a signal which is indicative of an asymmetrical fault being present in the phase to neutral voltages or phase to phase voltages across the power converter. Following a predetermined time delay after the occurrence of the fault indicating logic output signal, a predetermined protective acton is initiated, said action being, for example, the phasing back of gating to the converter thyristors and/or the tripping of a contactor or circuit breaker which interrupts the supply of AC power to the converter.

BRIEF DESCRIPTION OF THE DRAWINGS

While the present invention is particularly defined in the claims annexed to and forming a part of the specification, a better understanding can be had from the following description taken in conjunction with the accompanying drawing in which:

DETAILED DESCRIPTION OF THE INVENTION

Figure 1:
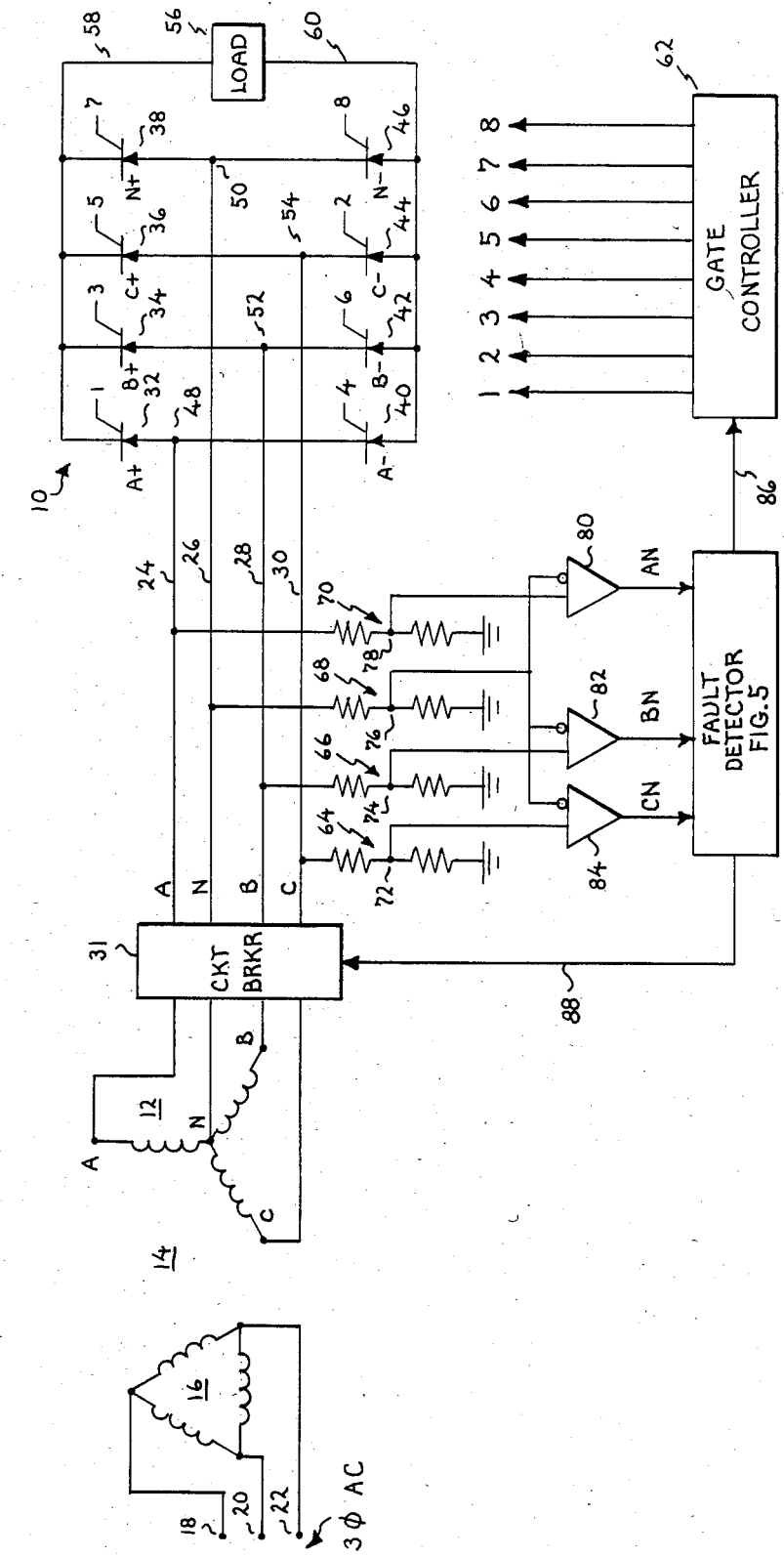
FIG. 1 is an electrical schematic diagram illustrative of an exemplary three phase power system supplying alternating current (AC) power to a conventional three phase, eight thyristor converter in accordance with the subject invention.

Referring now to the drawings, FIG. 1 is a schematic electrical diagram of a conventional three phase (3∅) eight thyristor bridge AC to DC power converter 10 coupled to three wye connected secondary windings 12 of a 3∅ transformer 14 whose delta connected primary windings 16 are coupled to a polyphase, more particularly a 3∅, power source by means of terminals 18, 20 and 22.

The secondary windings 12 comprise three windings A-N, B-N and C-N with a common point N being the neutral point of a wye connection of the windings. The winding end terminals A, B, C and N of the secondary windings 12 are coupled to the thyristor converter bridge 10 by means of four power line conductors 24, 26, 28 and 30 and a circuit breaker or contactor 31 of conventional design. The thyristor converter 10 is comprised of four thyristors 32, 34, 36 and 38 which form a positive A+, B+, C+ and N+ group of thyristors while thyristors 40, 42, 44 and 46 make up an opposing negative A−, B−, C− and N− group. As shown, conductor 24 for phase A connects to a circuit junction 48 which is common to the A+ and A− thyristors 32 and 40, while conductor 26 for system neutral N connects to circuit junction 50 which is common to the N+ and N− thyristors 38 and 46. Conductor 28 for phase B connects to junction 52 which is common to the B+ and B− thyristors 34 and 42, and finally line 30 for phase C connects to circuit junction 54 which is common to the C+ and C− thyristors 36 and 44. A DC load 56 which may be, for example, a DC to AC inverter is coupled across the converter 10 by means of electrical conductors 58 and 60. As shown, the conductor 58 is coupled to the common connection of the positive group of thyristors while the conductor 60 is connected to the common connection of the negative group of thyristors. A gate controller unit 62 is adapted to generate firing pulses for the eight thyristors of the converter 10 which are applied in any suitable predetermined sequence.

Phase to neutral voltages AN, BN and CN for the system shown in FIG. 1 are derived by means of four voltage divider networks 64, 66, 68 and 70 which are respectively connected from the power conductors 30, 28, 26 and 24 to ground. Each voltage divider provides a respective voltage at junctions 72, 74, 76 and 78 which is reduced, for example, to one one-hundredth of the instantaneous value of the voltage on the power conductors. Accordingly, each of the voltage dividers 64, 66, 68 and 70 is typically comprised of a 1 megohm fixed resistor connected in series with a 10 kilohm fixed resistor.

The value reduced phase to neutral voltages are respectively provided as inputs to three two input differential amplifiers 80, 82 and 84. More particularly, the inverting input of differential amplifier 80 is connected to circuit junction 76 of voltage divider 68 while the non-inverting input is connected to circuit junction 78 of voltage divider 70. In a like manner, the inverting input of differential amplifier 82 is connected to the circuit junction 76 of voltage divider 68 while the non-inverting input is connected to circuit junction 74 of voltage divider 66. Differential amplifier 84 has its inverting input connected to circuit junction 76 of divider 68 while its non-inverting input is connected to circuit junction 72 of the voltage divider 64.

As will be shown, the fault detector circuit of the present invention can be responsive to the three phase to neutral voltages AN, BN and CN and is operable to provide as an output a control signal on circuit lead 86, for example, which is adapted to phase back or inhibit generation of firing pulses applied to the thyristors of the converter 10 and/or provide an output signal on circuit lead 88, coupled to the circuit breaker 31, to effect an opening of the breaker and thus interrupt the supply of AC power to the converter 10.

Figure 2:
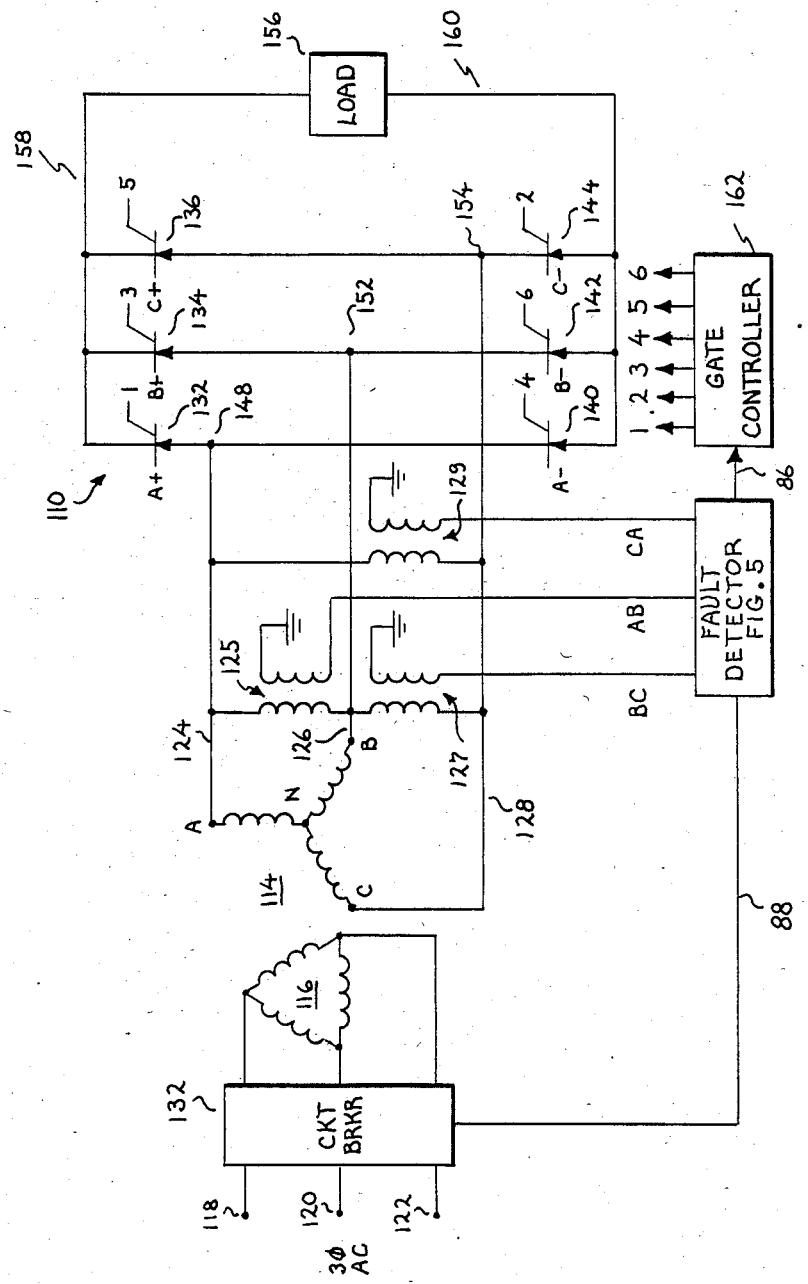
FIG. 2 is an electrical schematic diagram illustrative of an exemplary three phase power system supplying alternating current power to a conventional six thyristor converter in accordance with the subject invention.

While the system in FIG. 1 discloses an eight thyristor converter, the system of FIG. 2 is directed to a conventional six pulse converter configuration. As shown, a six pulse converter 110 is connected to the wye connected secondary windings 112 of a power transformer 114 whose delta connected primary windings 116 are connected to a three phase AC power source by means of terminals 118, 120 and 122. As opposed to the system of FIG. 1, the secondary windings 112 are directly coupled to the six pulse converter 110 by means of a three wire connection comprised of the conductors 124, 126 and 128. These conductors or power lines connect to three positive group (A+, B+ and C+) thyristors 132, 134, and 136 and three negative group (A−, B− and C−) thyristors 140, 142 and 144. The conductor 124 and end terminal A, providing one of the three phase voltages, is coupled to thyristors 132 and 140 at junction 148 while the conductor 126, providing the second phase voltage is connected to junction 152 between the thyristors 134 and 142. In a like manner, secondary terminal C providing the third phase voltage is connected to circuit junction 154 between the thyristors 136 and 144 by means of the conductor 128. The positive group thyristors 132, 134 and 136 are connected to one side of a DC load 156 by means of the circuit connection 158 while the negative group thyristors 140, 142 and 144 are connected to the opposite side of the load 156 by means of the circuit connection 160. In order to fire the thyristors of the six pulse converter 110, a six pulse gate controller unit 162 is operable to generate six firing pulses which are connected to the thyristors 132, 134, 136, 140, 142 and 144.

The system of FIG. 2 additionally differs from the system configuration of FIG. 1 in that whereas the circuit breaker 31 of FIG. 1 is connected to the secondary side of the power transformer 14, the system of FIG. 2 employs a circuit breaker 132 connected in the primary side of the power transformer 114 by being connected between the three phase AC power input terminals 118, 120 and 122 and the delta connected primary windings 116. Additionally, instead of employing voltage divider networks and differential amplifiers to generate the phase to neutral voltages AN, BN, and CN of FIG. 1, the three wire system of FIG. 2 derives phase to phase voltages AB, BC and CA by means of potential transformers 125, 127 and 129. Again, a fault detector circuitry of the present invention, as will be described, is operable to provide a first output signal to the gate controller 162 for phasing back or removing the gating to the converter thyristors and a second control output for activating circuit breaker 132.

Figure 4:
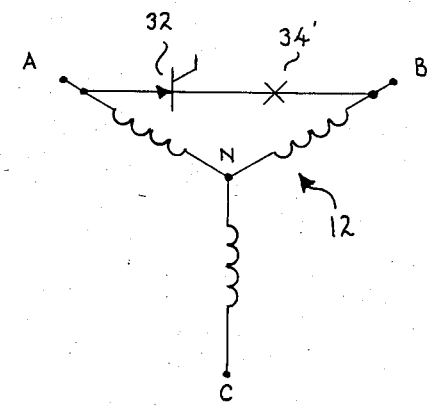
FIG. 4 is a simplified schematic diagram of a typical phase to phase fault for either of the systems shown in FIGS. 1 and 2.
Figure 3:
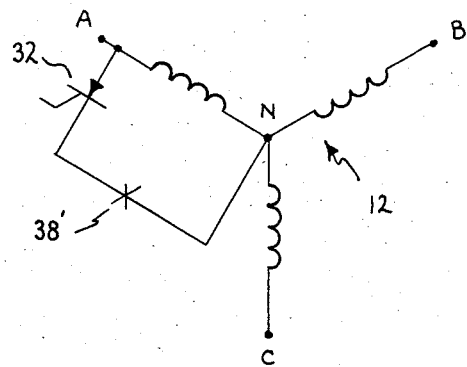
FIG. 3 is a simplified schematic diagram of a typical phase to neutral fault for the system shown in FIG. 1.

Before discussing the fault detection circuits of the present invention, reference will first be made to FIGS. 3 and 4 which are illustrative of two of the most common types of faults which can be detected by the present invention. FIG. 3 is illustrative of a phase to neutral fault occurring between secondary winding terminals A and N of the power transformer 12 of FIG. 1 resulting from a shorted thyristor, in this case, thyristor 38 and illustrated in FIG. 3 by 38′. FIG. 4 is illustrative of a phase to phase fault which occurs, for example, when one of the thyristor elements shorts, for example, thyristor 34 coupled between the secondary winding end terminals A and B by thyristor 32 and being shown by 34′. Other thyristors failing by shorting would, of course, result in similar problems as would certain other types of faults such as a short between two conductors for some other reason. Accordingly, the problem to be detected is a short circuit (unidirectional or bidirectional) between any two power conductors.

Figure 5:
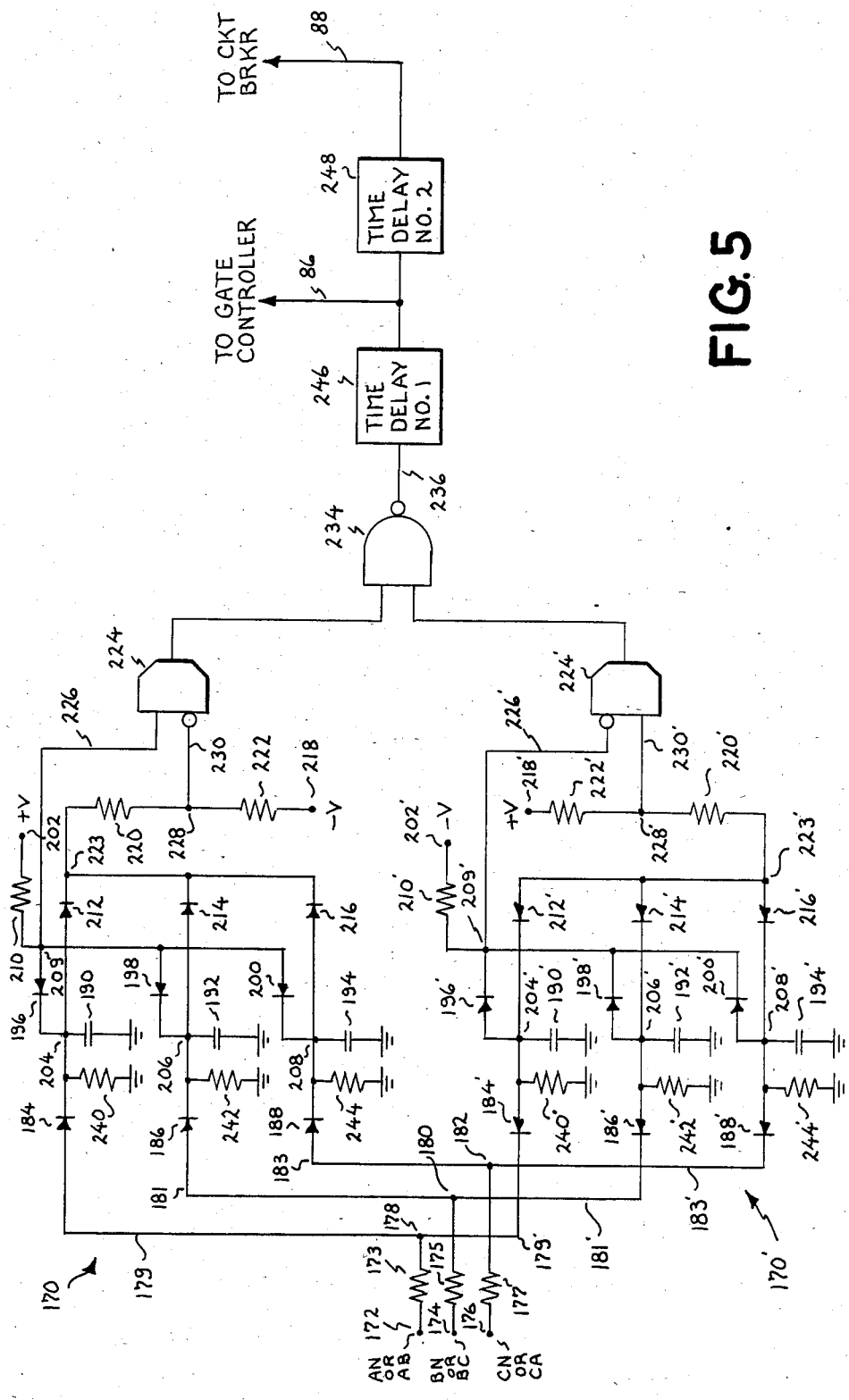
FIG. 5 is an electrical schematic diagram illustrative of a preferred embodiment of a fault detector circuit in accordance with the present invention for utilization in connection with the exemplary systems shown in FIGS. 1 and 2.

Turning attention now to FIG. 5, depicted is a bipolar fault detection circuit comprised of two circuit sections 170 and 170' which are essentially identical with the exception that the polarity of the diodes and the voltages are mutually reversed. More particularly, the three phase to neutral voltages AN, BN and CN as shown in FIG. 1 or the phase to phase voltages AB, BC and CA, as shown in FIG. 2, are respectively applied as input signals to circuit terminals 172, 174 and 176 whereupon they are commonly fed via respective input resistors 173, 175 and 177 to the circuit sections 170 and 170' via the junctions 178, 180 and 182 and circuit leads 179, 181, 183 and 179', 181' 183'.

Considering first the positive polarity circuit section 170, a first set of diodes 184, 186 and 188, respectively half-wave rectify the voltages applied to terminals 172, 174 and 176 and charge capacitors 190, 192 and 194. A second set of diodes 196, 198 and 200 are respectively connected between a source of positive supply potential (+V), applied at terminal 202, and capacitor circuit junctions 204, 206 and 208. Intermediate the voltage supplied to terminal 202 and junction 209 which is common to the diodes 196, 198 and 200 is a resistor 210. The magnitude of the supply potential applied to terminal 202 is such that when the input voltages at terminals 172, 174 and 176 are balanced, the voltages across capacitors 190, 192 and 194 is less than +V. Current will flow through the resistor 210 and the diodes 196, 198 and 200 and through a third set of diodes 212, 214 and 216 to a source of negative supply potential (−V) applied to terminal 218. This current is by way of a voltage divider network comprised of two series connected resistors 220 and 222 coupled between circuit junction 223 and the −V terminal 218. A dual input comparator circuit 224 is also included in the positive polarity detection section 170 and has one of its inputs (non-inverting) connected to circuit junction 209 by means of lead 226, while its other input (inverting) is coupled to a circuit junction 228 intermediate the resistors 220 and 222 by means of lead 230.

As long as the voltages at terminals 172, 174 and 176 are balanced, the voltages at circuit junctions 209, which has a voltage load representing the lowest rectified voltage, and 223, which has a voltage level representing the highest rectified voltage, will be essentially equal; however, the voltage at voltage divider circuit junction 228 (proportional to that at junction 223) and on lead 230 will be a preset amount more negative than that appearing at circuit junction 209 and on lead 226. Accordingly, the inputs to the comparator 224 applied via circuit leads 226 and 230 will be unequal, causing the comparator circuit to output a relatively high positive voltage indicative of a logic "1" signal due to the more positive voltage on input lead 226.

The negative polarity circuit section 170', in which the components are designated with like reference characters with a prime notation, is substantially identical excepting that the several diodes and the reference voltages are oppositely poled. Section 170' operates in a manner similar to section 170 with the exception that circuit junction 209' (low rectified voltage representation) is connected via circuit lead 226' to the inverting input of comparator circuit 224', while the circuit junction 228' (high rectified voltage representation) is connected to the non-inverting input of comparator 224' by means of the circuit lead 230', meaning that in the event of balanced input terminal voltages, the comparator 224' will also output a logic "1" signal. The outputs of the two comparators 224 and 224' are coupled to a two input NAND gate 234 which will provide a logic "0" output on circuit lead 236 indicative of a no fault condition when the two comparators 224 and 224' simultaneously provide a logic "1" output.

It should also be pointed out that capacitors 190, 192 and 194 also have a resistor 240, 242 or 244, respectively, connected in parallel to ground. Similarly, the negative circuit counterparts, namely, capacitors 190', 192' and 194' have shunting resistors 240', 242' and 244'. Each capacitor resistor combination is chosen so that the respective RC time constant is at least two or more cycles of the input power frequency, making the voltages across each of the capacitors substantially unaffected by the normal commutation notches produced by the thyristor power converter.

If a phase to neutral or phase to phase fault occurs because of a faulted thyristor in the converter 10 or 110, or for some other reason, the voltage distribution among the capacitors 190, 192, 194 and 190', 192', 194' will be altered significantly. For example, considering the phase to neutral fault shown in FIG. 3, the positive half of the phase to neutral voltage AN appearing at terminal 172 will be suppressed by thyristor conduction. The voltage across capacitor 190 will reduce to essentially zero through resistor 240 and the potential at circuit junction 209 will become less than at circuit junction 228 whereupon the comparator 224 will output a relatively low or logic "0" signal. With a logic "0" signal applied to one input of the NAND gate 234 and a logic "1" applied to its other input, the NAND gate will output a logic "1" on circuit 236.

For a phase to neutral fault of opposite polarity, the negative half of the line to neutral voltage AN will be suppressed and capacitor 190' will discharge, causing the comparator 224' to output a logic "1" which produces the same result at the output of the NAND gate 234. It is to be noted that since the phase to neutral voltages BN and CN are relatively unaffected, the voltages across capacitors 192, 192', 194 and 194' are relatively undisturbed.

For the phase to phase fault shown in FIG. 4, voltages across winding terminals A and N and B and N in one polarity are reduced to approximately one-half normal value, while the voltage across winding terminals C and N is relatively undisturbed. Accordingly, the voltages across capacitors 190 and 192 will be reduced to approximately one-half their normal values, while the voltage across capacitor 194 maintains its previous value. The resistance values of the voltage divider resistors 220 and 222 are selected such that the voltage at circuit junction 228 will now have a more positive value than that at circuit junction 209. Because junction 228 is coupled to the inverting input of the comparator 224 by circuit lead 230, the output of the comparator 226 will be at a relatively low value providing a logic "0" output, whereupon NAND gate 234 will output a logic "1" which is indicative of a fault. In the same manner, if an opposite polarity phase to phase fault occurs, the circuit section 170' will operate in the same manner to produce a logic "0" output from the comparator circuit 224' since the input thereto appearing on circuit lead 230' will be a negative value.

The detector circuit shown in FIG. 5 additionally includes two time delay circuits 246 and 248 which are The output of the first time delay circuit 246 is coupled connected in cascade to the output of the NAND gate 234. to the input of the second time delay circuit 248 as well as to circuit lead 86 which connects to the gate controller 62 of FIG. 1 or the gate controller 162 of FIG. 2. The output of the second time delay circuit 240 is connected to the circuit lead 88 which connects to the circuit breaker 32 of FIG. 1 or the circuit breaker 132 of FIG. 2. The signal appearing on circuit lead 86 from the first time delay circuit 246 comprises a signal to initiate a phasing back of converter thyristors to suppress and/or correct the fault or completely inhibit thyristor gating while the signal appearing on circuit lead 88 comprises a signal to trip, i.e., open the circuit breaker or as the case may be, the contactor. The time delay of the first time delay circuit 246 is selected to be greater than that required for initial excitation of the power transformer 14 or 114 and greater than the time required to suppress the fault current by thyristor phase back.

Accordingly, after the output of the NAND gate 234 becomes a logic "1", indicating a fault, the first time delay circuit 246 will signal the gate controller circuitry. After a second period of time, if the fault persists, the time delay circuit 248 will operate the circuit breaker to remove primary power from the converter.

Figure 6:
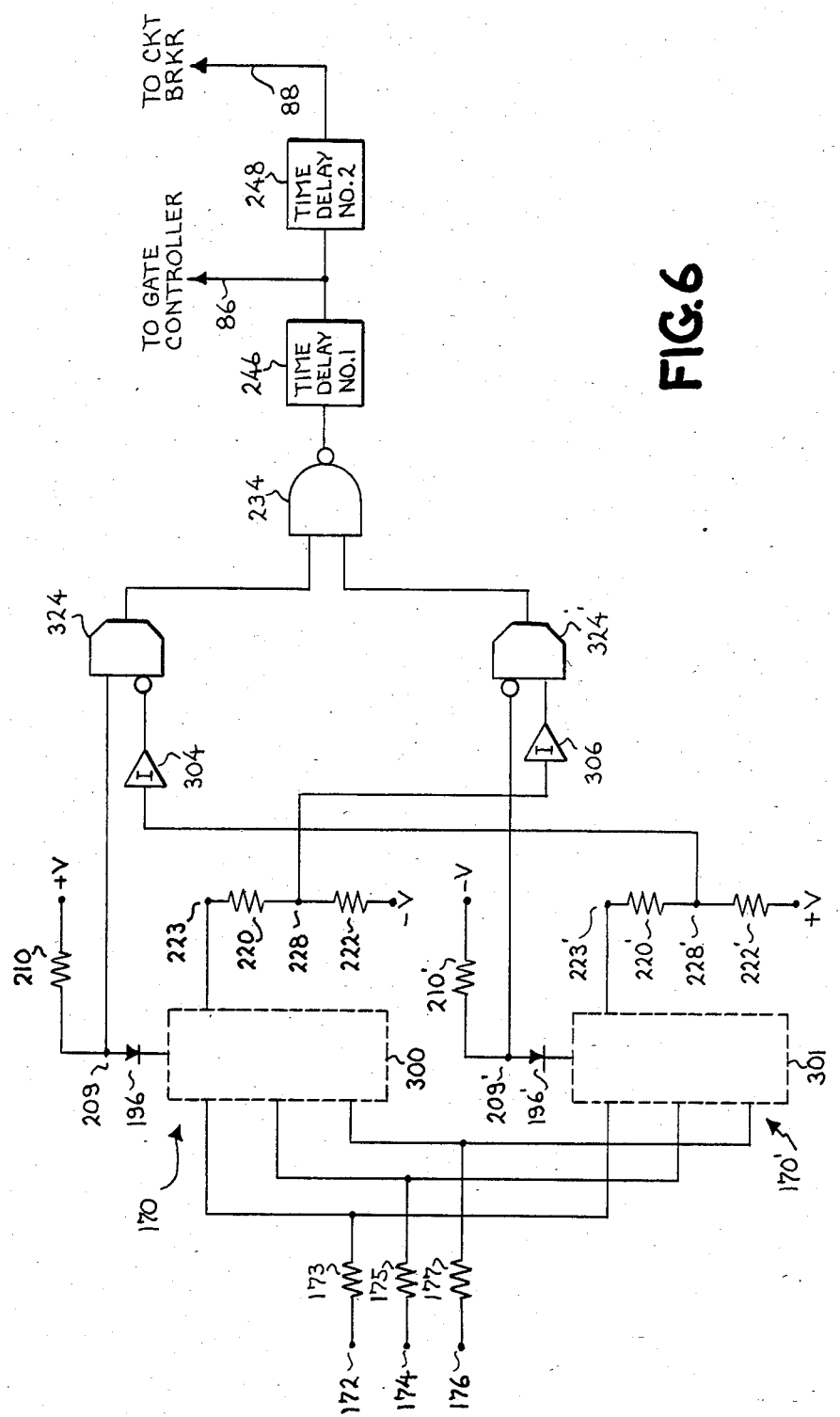
FIG. 6 is an electrical schematic diagram illustrative of a second preferred embodiment of a fault detector circuit in accordance with the present invention.

FIG. 6 illustrates a second embodiment of a detector circuit in accordance with the present invention. In FIG. 6, as is also the case with the embodiments to be described with respect to FIGS. 7 and 9, the difference with respect to the FIG. 5 embodiment lies in the manner in which the representations of the largest of the rectified voltages (as appear, in FIG. 5, at junctions 223 and 223'—also 228 and 228') are compared with the representations of the smallest of the rectified voltages (as appear, in FIG. 5, at junctions 209 and 209'). Thus in FIGS. 6, 7 and 9, the illustrations have been abbreviated in form with enough of the total circuit being shown to completely orient the reader, the rest of the circuit which is identical to that shown in FIG. 5 being represented by the dashed line boxes, e.g., boxes 300 and 301 in FIG. 6. Insofar as practical, like reference characters are employed in each of these embodiment illustrations as were employed with respect to FIG. 5.

Referencing now FIG. 6, it is seen that the voltage representation comparisons are made in a crossed fashion as by a comparison of the smallest voltage value from the positive section 170 with the largest voltage value from section 170' and, conversely, the smallest from section 170' with the largest from section 170. Thus, the signal at junction 209 is applied to the noninverting input of comparator 324 which further receives at its inverting input the signal from junction 228' as inverted by an inverter 304. In a similar manner, a comparator 324' receives the signal from junction 209' at its inverting input and the signal from junction 228, inverted by inverter 306, at its non-inverting input. The outputs of the two comparators 324 and 324' are furnished to NAND gate 234 and the operation of the overall circuit is as described with respect to FIG. 5.

An advantage of the cross connected embodiment as shown by FIG. 6 over what might be called the "straight" connection of FIG. 5 is that of less criticality of certain components. In the FIG. 5 embodiment, the several time constants of capacitor 190 and resistor 240, capacitor 192 and resistor 242, etc., and the coordination with the first time delay 246 is critical if a shorted neutral cell (e.g., cell 38 or cell 46 of FIG. 1) is to be detected. This is because, in the event of a shorted neutral cell, when the phase cells are rendered conductive the short circuit through the phase and neutral cells will cause the capacitors of a section, for example, capacitors 190, 192 and 194, to discharge at unequal rates and all of their capacitors will eventually completely discharge. Detection, therefore, must be accomplished during the transient unbalance time. The cross connection embodiment of FIG. 6 substantially eliminates this criticality since the voltages are taken from both the positive and negative sections. As an example, if neutral cell 38 (FIG. 1) is shorted, the voltage at junction 228' will not be reduced since this voltage is formed only from the negative half cycles of the sensed voltages.

Figure 7:
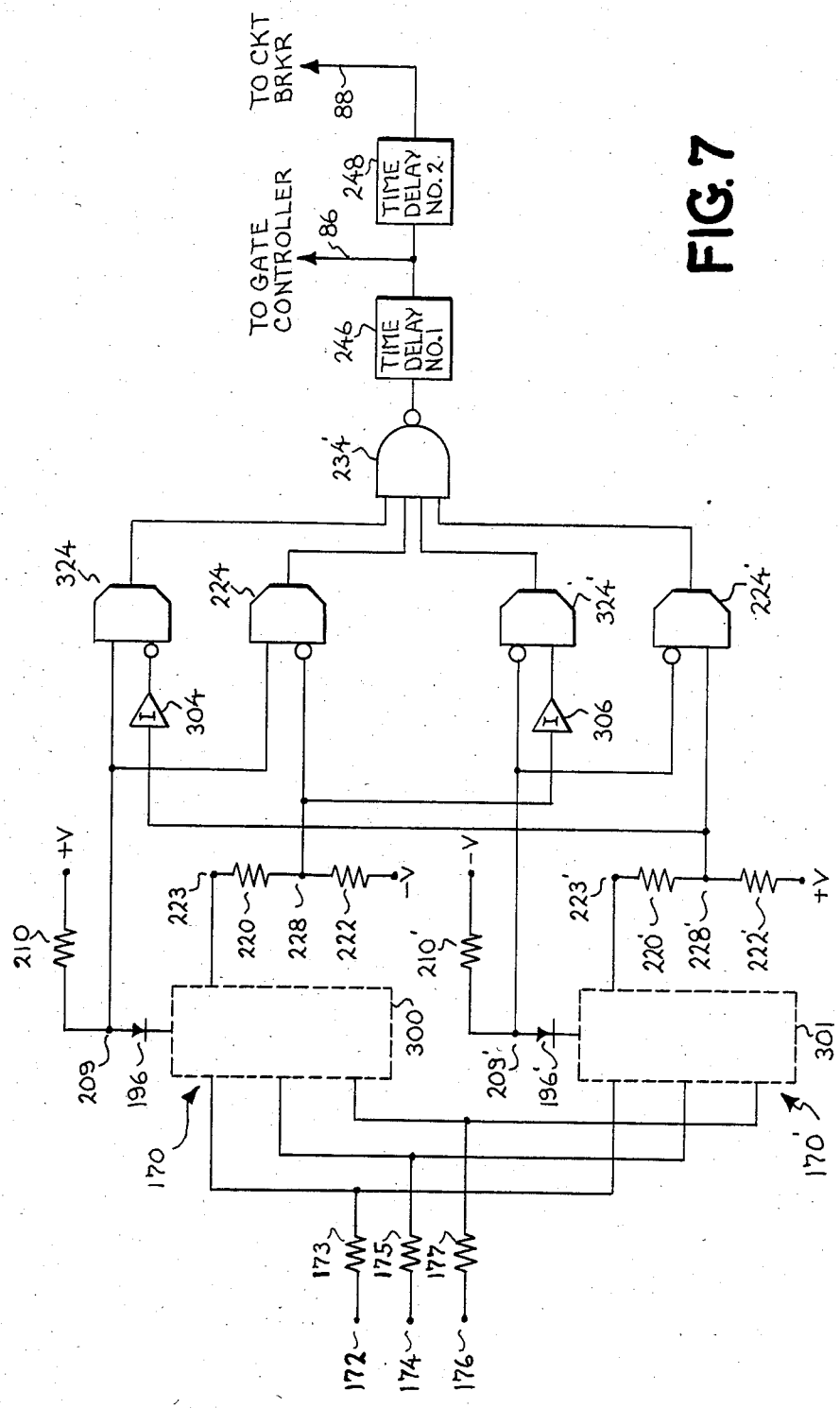
FIG. 7 is an electrical schematic diagram of a fault detector circuit in accordance with the present invention which utilizes the concepts of both the embodiments of FIGS. 5 and 6.

FIG. 7 illustrates a third embodiment of the present invention which is, essentially the combination of the two embodiments of FIGS. 5 and 6. That is, both "straight" and "crossed" comparisons are made and the outputs of four comparators 224, 224', 324 and 324' are furnished to a four input NAND gate 234'. In all other aspects the operation of the FIG. 7 embodiment are the same as previously described and further elaboration is not believed necessary.

Figure 8:
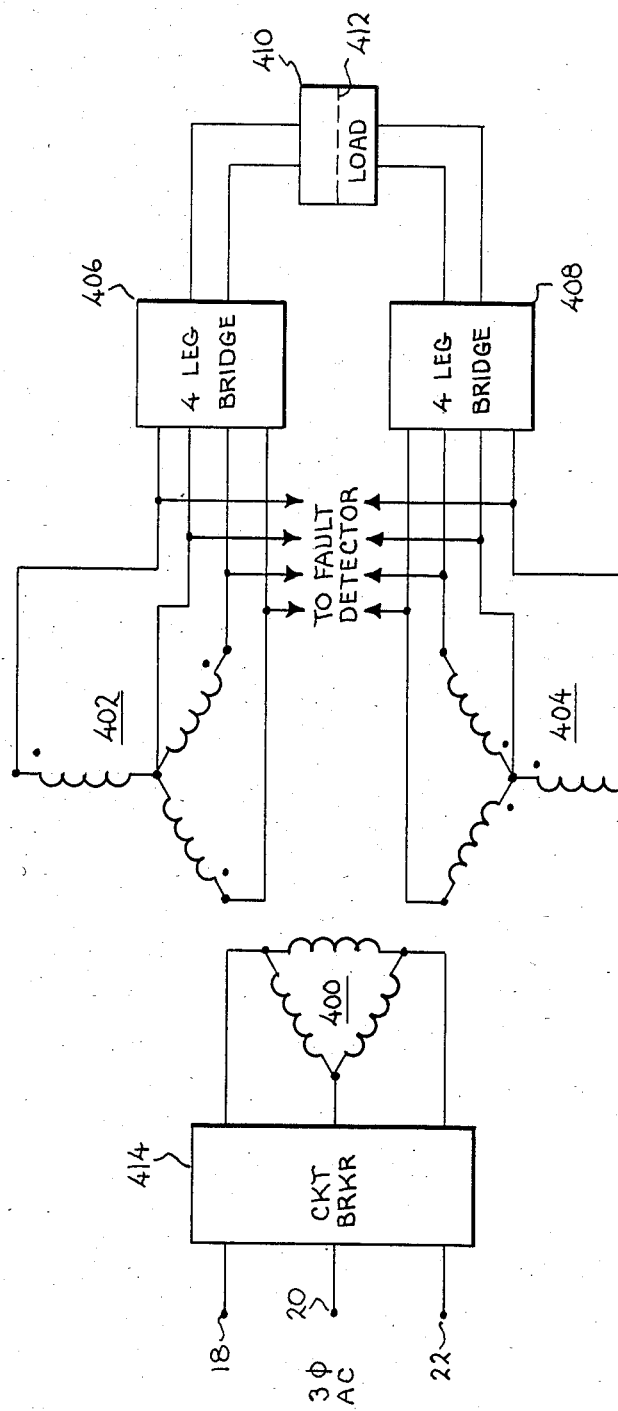
FIG. 8 is an electrical schematic diagram illustrative of a typical parallel three phase power system to which the present invention can also be applied; and, FIG. 9 is an electrical schematic diagram of one embodiment of the present invention as applied to a power system of the type shown in FIG. 8.

FIG. 8 illustrates a power configuration which is often used when neutral cells are employed in the bridge. As shown, a transformer primary 400 of delta configuration is connected to a source of three phase power represented by terminals 18, 20 and 22. Two wye connect secondaries 402 and 404 are connected, respectively, to two four leg bridges 406 and 408. The bridges 406 and 408 furnish power to a load 410. The two bridges are of the type shown at 10 in FIG. 1. The load 410 may be a single load such as a motor which is furnished with power by both bridges or it may be two separate loads as is indicated by the dashed line 412. A circuit breaker 414 is included in the manner shown in FIG. 2.

The windings of the two secondaries 402 ad 404 are, as is customary, phase displaced by 60 electrical degrees to provide electrical balance.

Figure 9:
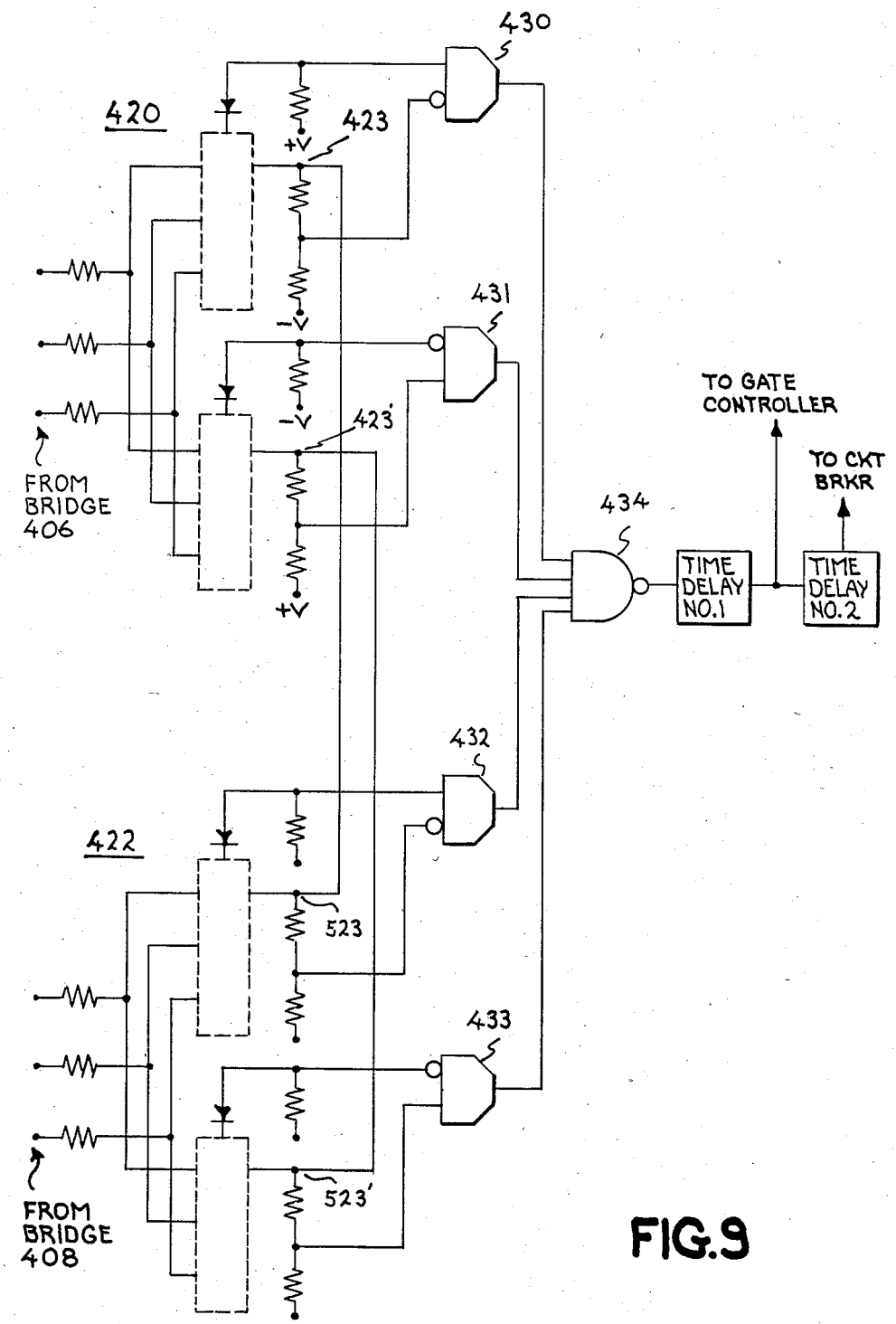

FIG. 9 illustrates the cross coupled embodiment of the present invention being applied to the power configuration of FIG. 8. As shown in FIG. 9, the fault detector of the present invention includes two parts 420 and 422. These two parts are connected, respectively, to the bridges 406 and 408 in the manner depicted in FIG. 1 and are cross coupled in a manner similar to that of FIG. 6 excepting that here the cross coupling is between the two parts 420 and 422. In this case, junction 423 and 423' of part 420 are cross coupled with junctions 523 and 523' of part 422. These junctions correspond respectively with junctions 223 and 223' of the earlier depictions. As was the case with the FIG. 7 embodiment, four comparisons are made, as by comparators 430 through 432, with the comparison results being applied to a four impact NAND gate 434. The output of NAND gate 434 is utilized in the identical manner as were the NAND gate outputs of the earlier embodiments.

One additional feature of this last embodiment which bears noting is that the inverters required in the earlier cross coupled embodiments are not here necessary. This is because the phase displacement of the two secondaries 402 and 404 (FIG. 8) provides the proper signals for cross coupling.

Thus what has been shown and described is a fault detector circuit for a thyristor power converter coupled to a polyphase AC source where each phase voltage is rectified with two half-wave rectifiers to produce positive and negative rectified voltages. Signals representing the largest amplitude and the smallest amplitude of the positive rectified voltages are developed as are signals representing the largest amplitude and the smallest amplitude of the negative rectified voltages. Using signals from both the positive and the negative voltages, at least one comparison is made to determine a difference which, when in excess of preset limits, effects a logic signal indicative of a fault existing phase to neutral or phase to phase with respect to the input power lines. Sequential protective action is provided in response to the logic signal first by phasing back the gating of the converter thyristors, and secondly, following another delay period, the opening of the contactor or circuit breaker connected into the circuitry supplying AC power to the thyristor converter.

While there have been shown and described what are at present considered to be the preferred embodiments of the present invention, modifications thereto will readily occur to those skilled in the art. It is not desired, therefore, that the invention be limited to the specific implementation shown and described, but it is intended to cover all such modifications, alterations and changes falling within the true spirit and scope of the invention as defined in the appended claims.

We claim:

1. A method which detects faults in a thyristor power converter coupled to and receiving power from a polyphase alternating current source by means of a plurality of power line conductors, comprising the steps of:
   (a) half-wave rectifying both the positive and negative portions of each phase voltage supplied to said converter from said source to provide, respectively, positive and negative rectified voltages;
   (b) determining the largest amplitude and the smallest amplitude of said positive rectified voltages and developing signals representative thereof;
   (c) determining the largest amplitude and the smallest amplitude of said negative rectified voltages and developing signals representative thereof;
   (d) utilizing signals developed from both the positive and negative rectified voltages to perform at least one comparison between a signal representative of a largest amplitude voltage and a signal representative of a smallest amplitude voltage to develop a signal indicative of the difference therebetween;
   (e) generating a fault indicating signal whenever said difference exceeds a predetermined limit; and
   (f) initiating a predetermined protective action in response to said fault indicating signal.

2. The method as defined by claim 1 wherein said polyphase alternating current source comprises a three phase alternating current source and said power converter selectively comprises either a six thyristor converter or an eight thyristor converter.

3. The method as defined by claim 1 wherein said power converter comprises an eight thyristor converter, said plurality of power line conductors comprises four power line conductors, including a neutral conductor, coupling said source to said converter, and wherein each said phase voltage comprises one of three phase to neutral voltages applied to said converter from said source.

4. The method as defined by claim 3 wherein said rectifying step (a) comprises rectifying the positive and negative portions of each of the three phase to neutral voltages.

5. The method as defined by claim 1 wherein said power converter comprises a six thyristor converter, said plurality of power line conductors comprises three conductors coupling said source to said converter, and wherein each said phase voltage comprises one of three phase to phase voltages applied to said converter from said source.

6. The method as defined by claim 5 wherein said rectifying step (a) comprises rectifying the positive and negative portions of each of the three phase to phase voltages.

7. The method as defined by claim 1 wherein said generating steps recited in steps (b) and (c) comprise generating binary digital logic signals.

8. The method as defined by claim 7 wherein said generating step recited in step (d) also comprises generating a binary digital logic signal.

9. The method as defined by claim 1 wherein said initiating step recited in step (e) comprises effecting a predetermined control of said thyristor power converter.

10. The method as defined by claim 1 wherein said initiating step recited in step (e) comprises phasing back the gating of thyristors in said thyristor power converter.

11. The method as defined by claim 1 wherein said initiating step recited in step (f) comprises interrupting the supply of alternating current power to said thyristor power converter.

12. A method which detects faults in a thyristor power converter coupled to and receiving power from a polyphase alternating current source by means of a plurality of power line conductors, comprising the steps of:
   (a) half-wave rectifying both the positive and negative portions of each phase voltage supplied to said converter from said source to provide, respectively, positive and negative rectified voltages;
   (b) comparing the respective levels of the rectified positive voltages, determining the difference between the largest amplitude and the smallest amplitude of said positive rectified voltages, and generating a signal indicative of the difference;
   (c) comparing the respective levels of the rectified negative voltages, determining the difference between the largest amplitude and the smallest amplitude of said negative rectified voltages, and generating a signal indicative of the difference;
   (d) generating a fault indicating signal whenever the difference determined by either of steps (b) and (c) exceeds respective predetermined positive and negative limits; and
   (e) initiating a predetermined protective action in response to said fault indicating signal.

13. The method as defined by claim 12 wherein said polyphase alternating current source comprises a three phase alternating current source and said power converter selectively comprises either a six thyristor converter or an eight thyristor converter.

14. The method as defined by claim 12 wherein said power converter comprises an eight thyristor converter, said plurality of power line conductors comprises four power line conductors, including a neutral conductor, coupling said source to said converter, and wherein each said phase voltage comprises one of three phase to neutral voltages applied to said converter from said source.

15. The method as defined by claim 14 wherein said rectifying step (a) comprises rectifying the positive and negative portions of each of the three phase to neutral voltages.

16. The method as defined by claim 12 wherein said power converter comprises a six thyristor converter, said plurality of power line conductors comprises three conductors coupling said source to said converter, and wherein each said phase voltage comprises one of three phase to phase voltages applied to said converter from said source.

17. The method as defined by claim 16 wherein said rectifying step (a) comprises rectifying the positive and negative portions of each of the three phase to phase voltages.

18. The method as defined by claim 12 wherein said generating steps recited in steps (b) and (c) comprise generating binary digital logic signals.

19. The method as defined by claim 10 wherein said generating step recited in step (d) also comprises generating a binary digital logic signal.

20. The method as defined by claim 12 wherein said initiating step recited in step (e) comprises effecting a predetermined control of said thyristor power converter.

21. The method as defined by claim 12 wherein said initiating step recited in step (e) comprises phasing back the gating of thyristors in said thyristor power converter.

22. The method as defined by claim 12 wherein said initiating step recited in step (e) comprises interrupting the supply of alternating current power to said thyristor power converter.

23. A method which detects faults in a thyristor power converter coupled to and receiving power from a polyphase alternating current source by means of a plurality of power line conductors, comprising the steps of:
 (a) half-wave rectifying both the positive and negative portions of each phase voltage supplied to said converter from said source to provide, respectively, positive and negative rectified voltages;
 (b) determining the largest amplitude and the smallest amplitude of said positive rectified voltages and developing signals representative thereof;
 (c) determining the largest amplitude and the smallest amplitude of said negative rectified voltages and developing signals representative thereof;
 (d) comparing a signal representative of the largest amplitude of a one of said positive and negative rectified voltages with a signal representative of the smallest of the other of said positive and negative rectified voltages and generating a signal indicative of the difference;
 (e) generating a fault indicating signal whenever said difference exceeds a predetermined limit; and
 (f) initiating a predetermined protective action in response to said fault indicating signal.

24. A method which detects faults in a thyristor power converter coupled to and receiving power from a polyphase alternating current source by means of a plurality of power line conductors, comprising the steps of:
 (a) half-wave rectifying both the positive and negative portions of each phase voltage supplied to said converter from said source to provide, respectively, positive and negative rectified voltages;
 (b) comparing the respective levels of the rectified positive voltages, determining the difference between the largest amplitude and the smallest amplitude of said positive rectified voltages, and generating a signal indicative of the difference;
 (c) comparing the respective levels of the rectified negative voltages, determining the difference between the largest amplitude and the smallest amplitude of said negative rectified voltages, and generating a signal indicative of the difference;
 (d) comparing the largest amplitude of a one of said positive and negative rectified voltages with the smallest of the other of said positive and negative rectified voltages and generating a signal indicative of the difference;
 (e) generating a fault indicating signal whenever the difference determined by any of steps (b), (c) and (d) exceeds a respective predetermined limit; and
 (f) initiating a predetermined protective action in response to said fault indicating signal.

25. A method which detects faults in a thyristor power converter coupled to and receiving power from a polyphase alternating current source by means of a plurality of power line conductors, comprising the steps of:
 (a) half-wave rectifying both the positive and negative portions of each phase voltage supplied to said converter from said source to provide, respectively, positive and negative rectified voltages;
 (b) determining the largest amplitude and the smallest amplitude of said positive rectified voltages and developing first signals representative thereof;
 (c) determining the largest amplitude and the smallest amplitude of said negative rectified voltages and developing second signals representative thereof;
 (d) cross comparing the signals representing the largest and smallest positive rectified voltages with, respectively, the signals representing the smallest and largest negative rectified voltages and generating difference signals indicative of the differences;
 (e) generating a fault indicating signal whenever either of said difference signals exceeds a respective predetermined limit; and
 (f) initiating a predetermined protective action in response to said fault indicating signal.

26. A method which detects faults in a thyristor power converter coupled to and receiving power from a polyphase alternating current source by means of a plurality of power line conductors, comprising the steps of:
 (a) half-wave rectifying both the positive and negative portions of each phase voltage supplied to said converter from said source to provide, respectively, positive and negative rectified voltages;
 (b) comparing the respective levels of the rectified positive voltages, determining the difference between the largest amplitude and the smallest amplitude of said positive rectified voltages, and generating a signal indicative of the difference;
 (c) comparing the respective levels of the rectified negative voltages, determining the difference between the largest amplitude and the smallest amplitude of said negative rectified voltages, and generating a signal indicative of the difference;
 (d) cross comparing the largest and smallest amplitudes of said positive rectified voltages with, respectively, the smallest and largest amplitudes of said negative rectified voltages and generating signals indicative of the differences;

(e) generating a fault indicating signal whenever a difference determined by either of steps (b), (c) and (d) exceeds a respective predetermined limit; and (f) initiating a predetermined protective action in response to said fault indicating signal.

27. A fault detecting system having a thyristor power converter coupled to and receiving power from a polyphase alternating current source by means of a plurality of power line conductor means comprising:

(a) means for providing alternating current signals corresponding to the phase voltage of each phase of polyphase alternating current power supplied to said converter;

(b) means for rectifying both the positive and negative portions of each alternating current signals and providing a first plurality of rectified signals having respective amplitudes proportional to the individual positive portions of each phase voltage and a second plurality of rectified signals having respective amplitudes proportional to the individual negative portions of each phase voltage;

(c) means for comparing a signal indicative of a largest amplitude of a one of said pluralities of rectified signals with a signal indicative of a smallest amplitude of the other of plurality of rectified signals to develop a difference signal; and (d) means responsive to said difference signals for generating a fault indicating signal whenever said difference signal exceeds a predetermined limit.

28. The system as defined by claim 27 and additionally including, (e) means for effecting a predetermined protective action for said system in response to said fault indicating signal.

29. The system as defined by claim 28 and wherein said power converter includes a plurality of selectively gated thyristors and wherein said means (e) for effecting a predetermined protective action comprises means for phasing back the gating of said thyristors in said power converter.

30. The system as defined by claim 29 wherein said means (e) additionally includes time delay means for delaying said phasing back for a predetermined time delay following generation of said fault indication signal.

31. The system as defined by claim 28 and additionally including:

(f) means for interrupting the supply power to said converter and, wherein said means (e) for effecting a protective action comprises means for activating said interrupting means to interrupt the supply of AC power to the converter in response to said logic signal output from said fault indicating signal generating means.

32. The system as defined by claim 31 wherein said means (e) additionally includes time delay means for delaying the activation of said interrupting means for a predetermined time delay following generation of said fault indicating signal.

33. The system as defined by claim 27 wherein said rectifying means comprises first and second half-wave rectifier means for respectively rectifying the positive and negative portions of said alternating current signals.

34. A fault detecting system having a thyristor power converter coupled to and receiving power from a polyphase alternating current source by means of a plurality of power line conductor means comprising:

(a) means providing alternating current signals corresponding to the phase voltage of each phase of polyphase alternating current power supplied to said converter;

(b) means for rectifying both the positive and negative portions of each alternating current signals and providing a first plurality of rectified signals having respective amplitudes proportional to the individual positive portions of each phase voltage and a second plurality of rectified signals having respective amplitudes proportional to the individual negative portions of each phase voltage;

(c) means for comparing the respective amplitudes of said first plurality of rectified signals and generating a signal indicative of the difference between the largest amplitude and the smallest amplitude of said first plurality of rectified signals;

(d) means for comparing the respective amplitudes of said second plurality of rectified signals and generating a signal indicative of the difference between the largest amplitude and the smallest amplitude of said second plurality of rectified signals; and (e) means responsive to both said difference signals for generating a fault indicating signal whenever either of said difference signals exceeds predetermined respective limits.

35. The system as defined by claim 34 wherein said rectifying means comprises first and second half-wave rectifier means for respectively rectifying the positive and negative portions of said alternating current signals.

36. The system as defined by claim 35 wherein said first and second half-wave rectifier means each includes:

(i) a first set of rectifier diodes, one for each alternating current signal corresponding to each phase voltage, coupled to and adapted to charge a respective capacitance; and wherein said comparing and generating means (c) and (d) each includes, (ii) a second set of diodes, one for each capacitance, coupled between a first voltage level and the respective capacitance at a first common circuit connection, (iii) a third set of diodes, one for each capacitance, coupled between the respective capacitance and a second common circuit connection, (iv) a voltage divider network coupled between said second common circuit connection and second voltage level and having a selected voltage pick-off point, and (v) dual input comparator means providing a binary digital logic output signal in response to the respective voltage level at said dual inputs, one of said inputs being coupled to said first common circuit connection of said second set of diodes and the other of said inputs being coupled to said voltage pick-off point.

37. The system as defined by claim 36 wherein said first and second voltage levels comprise predetermined voltage levels of mutually opposite polarity, and, wherein said comparator means (v) comprises a comparator having one of said dual inputs comprising a non-inverting input, and the other of said dual inputs comprising an inverting input.

38. The system as defined by claim 36 wherein said means (e) for generating a fault indicating signal includes a dual input logic gate coupled to the binary digital logic output signal of said comparator means and at least one time delay means coupled to the output of said logic gate selectively phasing back thyristor gating of said converter and/or interupting power supplied to said converter from said source.

39. The system as defined by claim 38 wherein said at least one time delay means comprises a first time delay means providing a relatively short time delay for delaying the phasing back of said thyristor gating and a second time delay means providing a relatively long time delay for interrupting said supply of power to the converter.

40. The system as defined by claim 38 wherein said logic gate comprises a NAND gate.

41. The system as defined by claim 34 wherein said difference signal generating means of the means (c) and (d) comprises logic signal generator means, providing respective logic signal outputs, and wherein said fault indicating signal generating means (e) comprises logic signal generator means providing a logic signal output in response to the logic signal output of said difference signal gnerator means.

42. The system as defined by claim 34 wherein said thyristor converter includes a plurality of thyristors coupled together in a bridge circuit.

43. The system as defined by claim 42 wherein said source comprises a three phase source, and said thyristor bridge circuit comprises a three phase bridge.

44. The system as defined by claim 43 wherein said three phase bridge comprises an eight thyristor bridge, said power line conductor means comprises four power line conductors coupled between said bridge and said source, and, wherein said three phase source includes a power transformer including a wye connected secondary winding configuration coupled to said four conductors.

45. The system as defined by claim 43 wherein said three phase bridge comprises a six thyristor bridge, said plurality of power line conductor means comprises three power line conductors coupled between said bridge and said source, and wherein said source includes a power transformer including a wye connected secondary winding configuration coupled to said three power line conductors.

46. A fault detecting system having a thyristor power converter coupled to and receiving power from a polyphase alternating current source by means of a plurality of power line conductor means comprising:
(a) means providing alternating current signals corresponding to the phase voltage of each phase of polyphase alternating current power supplied to said converter;
(b) means for rectifying both the positive and negative portions of each alternating current signals and providing a first plurality of rectified signals having respective amplitudes proportional to the individual positive portions of each phase voltage and a second plurality of rectified signals having respective amplitudes proportional to the individual negative portions of each phase voltage;
(c) means for comparing a signal indicative of a largest amplitude of a one said plurality of rectified signals with a signal indicative of the smallest amplitude of the other of said plurality of rectified signals and generating a difference signal indicative of the difference therebetween; and
(d) means responsive to said difference signals for generating a fault indicating signal whenever said difference signal exceeds a predetermined limit.

47. A fault detecting system having a thyristor power converter coupled to and receiving power from a polyphase alternating current source by means of a plurality of power line conductor means comprising:
(a) means providing alternating current signals corresponding to the phase voltage of each phase of polyphase alternating current power supplied to said converter;
(b) means for rectifying both the positive and negative portions of each alternating current signals and providing a first plurality of rectified signals having respective amplitudes proportional to the individual positive portions of each phase voltage and a second plurality of rectified signals having respective amplitudes proportional to the individual negative portions of each phase voltage;
(c) means for comparing the respective amplitudes of said first plurality of rectified signals and generating a signal indicative of the difference between the largest amplitude and the smallest amplitude of said first plurality of rectified signals;
(d) means for comparing the respective amplitudes of said second plurality of rectified signals and generating a signal indicative of the difference between the largest amplitude and the smallest amplitude of said second plurality of rectified signals;
(e) means for comparing the largest amplitude of a one of said pluralities with the smallest amplitude of the other of said pluralities and generating a signal indicative of the difference therebetween; and,
(f) means responsive to said difference signals for generating a fault indicating signal whenever any of said difference signals exceeds predetermined respective limits.

48. A fault detecting system having a thyristor power converter coupled to and receiving power from a polyphase alternating current source by means of a plurality of power line conductor means comprising:
(a) means providing alternating current signals corresponding to the phase voltage of each phase of polyphase alternating current power supplied to said converter;
(b) means for rectifying both the positive and negative portions of each alternating current signals and providing a first plurality of rectified signals having respective amplitudes proportional to the individual positive portions of each phase voltage and a second plurality of rectified signals having respective amplitudes proportional to the individual negative portions of each phase voltage;
(c) means for cross comparing signals representing the largest and smallest of said first plurality of rectified signals with, respectively, the smallest and largest of said second plurality of rectified signals and for generating difference signals indicative of the differences; and
(d) means responsive to both said difference signals for generating a fault indicating signal whenever either of said difference signals exceeds predetermined respective limits.

49. A fault detecting system having a thristor power converter coupled to and receiving power from a polyphase alternating current source by means of a plurality of power line conductor means comprising:

(a) means providing alternating current signals corresponding to the phase voltage of each phase of polyphase alternating current power supplied to said converter;

(b) means for rectifying both the positive and negative portions of each alternating current signals and providing a first plurality of rectified signals having respective amplitudes proportional to the individual positive portions of each phase voltage and a second plurality of rectified signals having respective amplitudes proportional to the individual negative portions of each phase voltage;

(c) means for comparing the respective amplitudes of said first plurality of rectified signals and generating a signal indicative of the difference between the largest amplitude and the smallest amplitude of said first plurality of rectified signals;

(d) means for comparing the respective amplitudes of said second plurality of rectified signals and generating a signal indicative of the difference between the largest amplitude and the smallest amplitude of said second plurality of rectified signals;

(e) means for cross comparing signals representing the largest and smallest of said first plurality of rectified signals with, respectively, the smallest and largest of said second plurality of rectified signals and for generating difference signals indicative of the difference; and (f) means responsive to said difference signals for generating a fault indicating signal whenever any of said difference signals exceeds predetermined respective limits.

* * * * *